T. B. WRIGHT.
AUTOMOBILE DIRECTION INDICATOR.
APPLICATION FILED FEB. 26, 1917.
1,263,984.
Patented Apr. 23, 1918.
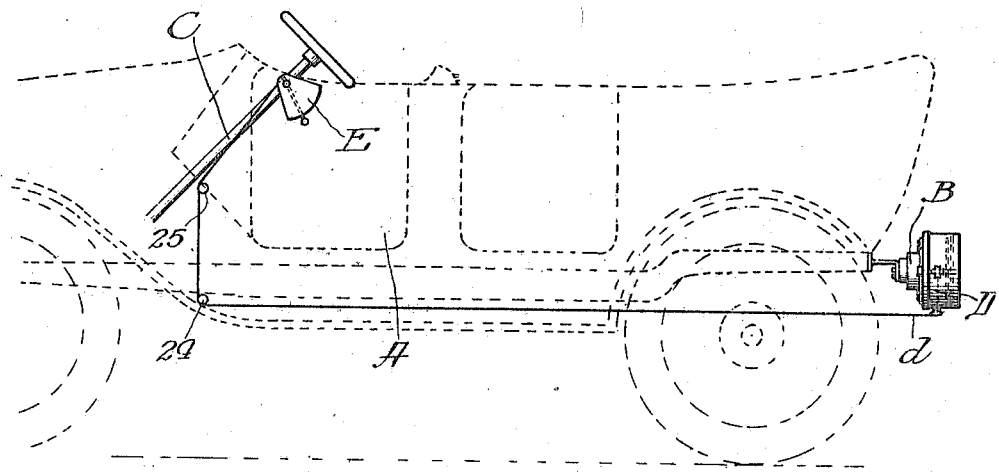
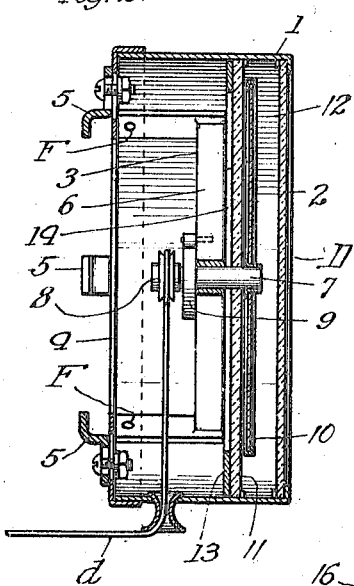
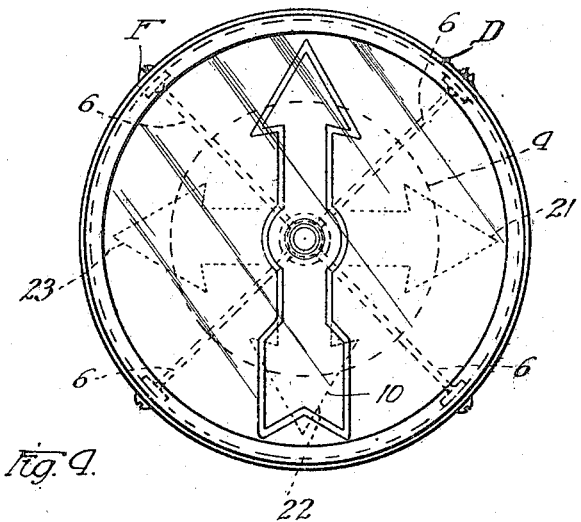
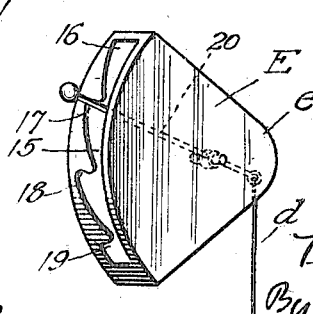
Witnesses
Robert W. Weir
Arthur W. Carkop
Inventor
Thomas B. Wright
By Arthur F. Durand
Atty

UNITED STATES PATENT OFFICE.

THOMAS B. WRIGHT, OF CHICAGO, ILLINOIS, ASSIGNOR TO THE WRIGHT TRAFFIC SIGNAL COMPANY, OF CHICAGO, ILLINOIS, A CORPORATION OF ILLINOIS.

AUTOMOBILE DIRECTION-INDICATOR.

1,263,984.　　　　Specification of Letters Patent.　　Patented Apr. 23, 1918.

Application filed February 26, 1917. Serial No. 150,892.

*To all whom it may concern:*

Be it known that I, THOMAS B. WRIGHT, a citizen of the United States of America, and resident of Chicago, Cook county, Illinois, have invented a certain new and useful Improvement in Automobile Direction-Indicators, of which the following is a specification.

My invention relates to devices for indicating the direction of travel of an automobile.

Generally stated, the object of my invention is to provide a novel and improved device of this general character.

Special objects are to provide an improved construction and arrangement whereby a device of this kind can be applied to the ordinary lamp of an automobile, such as the usual tail light, so that the device will serve the double purpose of direction-indicator and ordinary lamp; to provide an improved construction and arrangement whereby the direction-indicator can be readily controlled by the person driving the machine; to provide an improved construction and arrangement whereby a device of this kind can be installed on an automobile with comparatively little expense; and to provide an improved construction and arrangement whereby a device of this kind will be reliable and serviceable in use and not liable to get out of order.

It is also an object to provide certain details and features of construction and combinations tending to increase the general efficiency and serviceability of a direction-indicator of this particular character.

To the foregoing and other useful ends, my invention consists in matters hereinafter set forth and claimed.

In the accompanying drawings:—

Figure 1 is a side elevation of an automobile (shown in dotted lines) equipped with a direction-indicator embodying the principles of my invention.

Fig. 2 is a vertical longitudinal section of said indicator.

Fig. 3 is a rear elevation of said indicator.

Fig. 4 is a perspective of the controller for said indicator, which is mounted on a steering-column of the machine.

As thus illustrated, the automobile A can be of any suitable, known or approved form or construction. At the rear end of the machine, the usual lamp or tail-light B is suitably secured in place thereon. A steering-column C is arranged as usual at the front of the machine. An indicator D, embodying the principles of my invention, is attached to said lamp and connected by a wire or cord $d$ with the controller E on the steering-column.

Said indicator, as shown and described, is constructed as follows: The metal box 1 is cylindric in form and provided with a transparent glass plate 2 which faces rearward. The back wall 3 of the box is provided with a central opening 4, and with adjustable clips or clamping-devices 5 to engage the rim of the lamp. When the box 1 is secured in place upon the lamp, the interior of the box is practically sealed against the entrance of dust or moisture. Within the box there is a support 6 for the central horizontal shaft 7, which latter is provided at its rear end with a drum 8 for the wire or cord $d$, whereby said shaft can be rotated. A clock-spring 9 is applied to said shaft to yieldingly resist rotation thereof from its normal position, and to return the shaft to normal position when said wire or cord is released at its forward end. An arrow 10 is secured to the front end of said shaft, said arrow being preferably constructed with a metal outline or frame which incloses a sheet of red glass, said frame having the shape of the arrow. A plate 11 of white glass (glass which appears white by daylight but which is sufficiently transparent to allow the light of the lamp to pass through) is secured within the box immediately behind said arrow, so that the latter revolves in a practically dust-and-moisture-tight chamber 12 at the rear of the box. A metal disk 13 is secured to the shaft immediately in rear of the glass plate 11, and this disk 13 is provided with an opening 14 which is directly opposite said arrow, and which is exactly the same in shape and outline as said arrow, so that the light is only allowed to pass through this opening and the red glass of the arrow. With this construction, the indicator by daylight shows a red or dark colored arrow on a white background, which is plainly visible to the occupants of other machines traveling in rear of the automobile on which this indicator is used. At night time, however, the indicator will show a red arrow on a black background, so that the device as a whole will serve both as a tail-light and as a direction-indicator. The entire interior of the box can be finished to serve as a reflector, so that the light will not be absorbed, but will be concentrated and projected through the opening 14 of the metal plate, and then through the glass plates and the arrow to produce the desired effect. Of course, the light is not necessary during the day-time, as the arrow contrasts sharply with the white background provided by the plate 11, and is plainly visible by daylight.

The controller E may be of any suitable character. As shown, however, it consists of a metal box e having a curved slot 15 formed with notches 16, 17, 18 and 19, which latter provide four positions for the pivoted lever 20 by which the indicator is controlled. This lever is inclosed within said box, and connected in any suitable manner with the wire or cord d, whereby the latter can be operated to control the indicator at the rear of the automobile. With the lever in the notch 16, the arrow is in the position shown in Fig. 3, which indicates that the automobile is going ahead. When the lever is pulled down to the notch 17, the arrow is rotated until its point occupies a position at 21, which indicates that the machine is going to turn to the right. When the lever engages the notch 18, the arrow is upside-down, with its point at the position indicated at 22, indicating that the machine is preparing to stop or reverse its forward movement. When the lever is moved into engagement with the notch 19, the point of the arrow then occupies the position indicated at 23, which means that the machine will turn to the left. In this way, the controller has four positions, and the indicator at the rear is operated accordingly, thereby indicating to the occupants of other machines whether the machine with the indicator is going to turn to the right or to the left, or continue ahead or slow up and reverse its movement. The spring 9, it will be understood, is strong enough to always return the arrow to its normal position, as shown in Fig. 3, and to return the lever 20 to the notch 16 when released from any of the other notches.

From the foregoing, it will be seen that the indicator and the controller therefor can be cheaply manufactured, and can be easily and conveniently applied to any automobile, with comparatively little expense. If necessary or desirable, small sheaves 24 and 25 can be provided at the front of the machine to guide the wire or cord d, and to facilitate the operation thereof by the controller. Obviously, however, the said controller can be mounted in any convenient place on the machine, and is not necessarily supported by the steering-column. If desired, a split collar or clamp of any suitable character can be employed for removably clamping the box e upon the steering-column. Furthermore, it will be understood that I do not limit myself to the exact construction shown and described.

It will be seen that the support 6 is in the form of a spider which has its outer ends secured to the interior of the box by the screws F by which the plate 3, which is shaped like a cover, is held in place. In this way, said screws perform the double function of holding said plate or cover in position, and of holding the spider-shaped support or bearing 6 in position to properly support the shaft.

Furthermore, it will be understood that the disk 14 can be omitted, if desired, and in such case the arrow will appear dark on a luminous background at night. Or, if desired, the glass plate 11 can be omitted, and the surface of the metal disk 13 can be painted white to take the place of said glass plate.

It will also be understood, of course, that the arrow can be made not only of red glass, but also of red translucent material of any kind, such as celluloid or other similar materials. This is also true of the glass plates, as instead of glass for the white plate and the transparent plate celluloid can be employed for this purpose, or any other translucent and transparent materials.

From the foregoing, it will be seen that a red arrow is provided which is directly under the control of the driver, and which serves, therefore, as both a direction-indicator and danger-signal, whereby only the regular lamps of the automobile are necessary, the indicator being applied to any such lamp as an attachment. At night, a red lamp is universally recognized instantly as a danger-signal, and an arrow is the unmistakable indication of direction. Thus, the two things are combined in one device, and when combined with a controller having a means to operate the indicator at will, the structure serves the double function of lamp and direction-indicator, for the arrow, which is bright red in daylight, and also at night, is recognized at once as being a danger-signal and a direction-indicator. Moreover, at night if the lamp goes out the arrow will still appear red against a white background whenever the head-lights of other machines are flashed thereon or when the street-lamps shine on the device, so that practically under all conditions the device will serve the double purpose for which it is intended.

I do not limit myself to the exact construction shown and described.

What I claim as my invention is:—

1. In a device for the purpose described, a rotary member of arrow shape and of red translucent material to serve as a direction-indicator and danger-signal for automobiles, a background for said arrow, a lamp behind said background, so that said arrow will appear red against a contrasting background in day-time and also at night, means to support said background and arrow in front of said lamp, and devices controlled by the driver to rotate said arrow.

2. The structure of claim 1, as stated, said background comprising a plate of white translucent material, and said device having a casing provided with a transparent front plate, to thereby form a tight compartment between said plates for said arrow.

3. The structure of claim 1, as stated, in which said background has a white surface, and said arrow a red surface, whereby at night if said lamp goes out the head-lights of other automobiles and the street-lamps that shine on said device will cause said arrow to appear red against a white background.

4. The structure of claim 1, as stated, said arrow having a normal upright position from which it is rotatable in one direction only, and three other positions to indicate that the automobile will turn to the right or to the left or will stop, said devices including means to rotate said arrow backward to normal position.

5. The structure of claim 1, as stated, said member and background and means being detachable so that said lamp can be used alone.

Signed by me at Chicago, Illinois, this 20th day of February, 1917.

THOMAS B. WRIGHT